July 10, 1945.  H. A. SIEDENTOPF  2,380,339
METHOD AND APPARATUS FOR PRESERVING BIOLOGICAL SUBSTANCES
Filed July 10, 1941  2 Sheets-Sheet 1
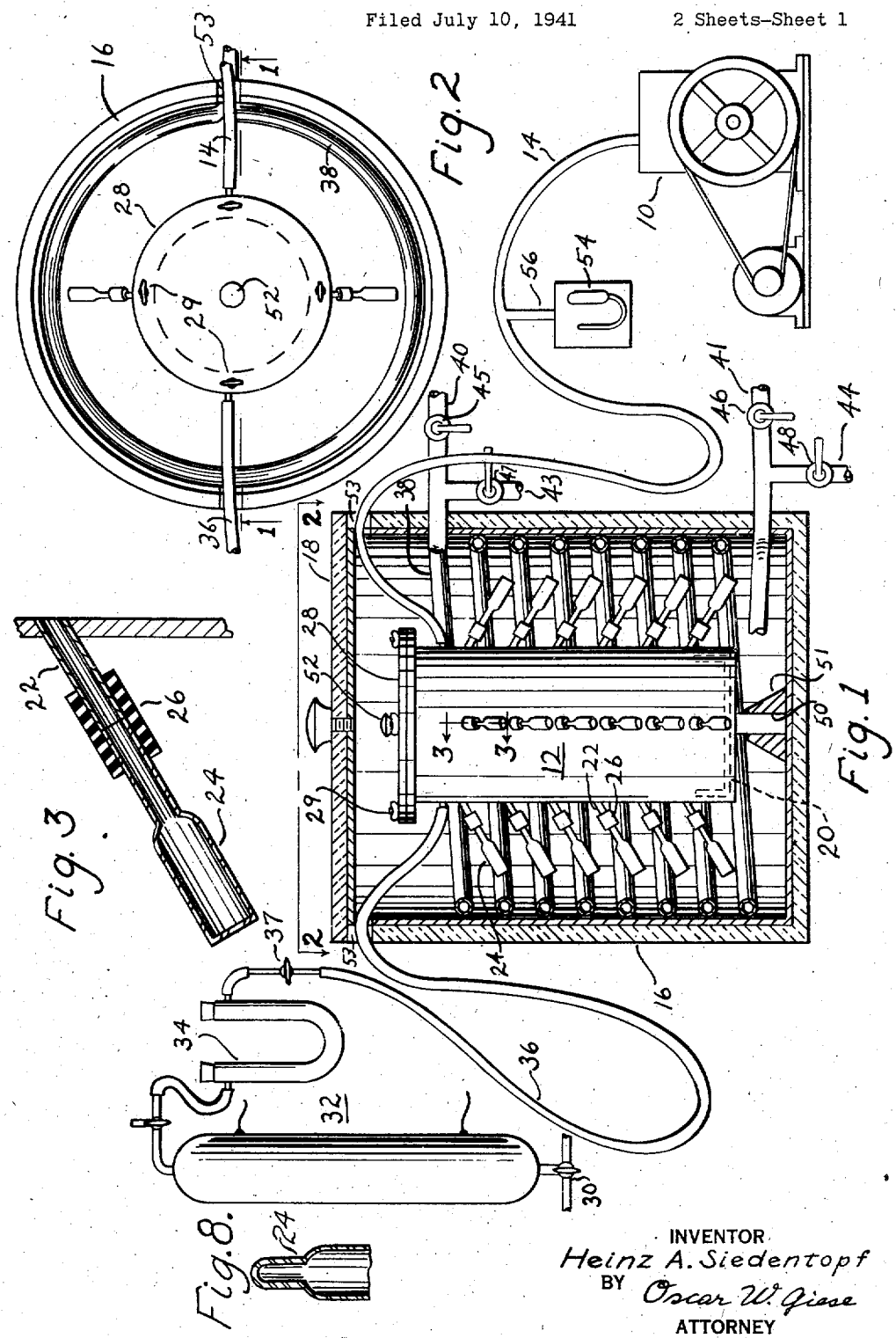
INVENTOR
Heinz A. Siedentopf
BY Oscar W. Giese
ATTORNEY July 10, 1945.  H. A. SIEDENTOPF  2,380,339
METHOD AND APPARATUS FOR PRESERVING BIOLOGICAL SUBSTANCES
Filed July 10, 1941  2 Sheets-Sheet 2

INVENTOR
Heinz A. Siedentopf
BY Oscar W. Giese
ATTORNEY

Patented July 10, 1945

2,380,339

UNITED STATES PATENT OFFICE 2,380,339

METHOD AND APPARATUS FOR PRESERVING BIOLOGICAL SUBSTANCES

Heinz A. Siedentopf, St. Paul, Minn., assignor to Fromm Laboratories, Inc., Grafton, Wis., a corporation of Wisconsin Application July 10, 1941, Serial No. 401,871

29 Claims. (Cl. 128—272)

This invention relates to the preservation of biological substances such as blood plasma, sera, complement, viruses, proteinous solutions, and the like, by desiccation from the frozen state, and maintenance of the desiccated substances under such conditions as to prevent deterioration or loss of potency over extended periods of time.

More particularly the invention relates to a method and apparatus for carrying out the desiccation quickly and completely under conditions which are optimum from the standpoint of preserving the original activity of the substances. Moreover, the invention relates to the packaging of the desiccated substances in such a manner that deterioration will not take place during prolonged periods of storage at relatively high temperatures.

The desiccation of biological substances while in the frozen state has been the subject of previous research and the present invention may be considered an improvement over the basic process described by L. F. Shackell (Amer. Jour. Physiol., 1909, vol. 24, pp. 325–340). As in the earlier method, the present procedure involves the removal of the moisture contained in the substance by subjecting it to the action of a very high vacuum while in the frozen condition. Moreover, the vacuum desiccation is preferably carried out in the presence of a chemical drying agent.

Although the process described by Shackell is satisfactory for use on a laboratory scale, it is not entirely satisfactory for the large scale commercial production and distribution of desiccated biological substances. Furthermore, it does not satisfactorily solve the problem of economical packaging and prevention of deterioration of the substances during storage at atmospheric temperatures for long periods of time.

The problem of container breakage encountered as the result of shipment of the usual glass containers through the ordinary channels of distribution is particularly serious when the containers are sealed under vacuum by heating and drawing the ends to a long sharp point and this difficulty is overcome by the present invention.

In general, the present invention has for its object the economical preservation of biological substances under such conditions as will insure the retention of all their original potency and other desirable characteristics over very long periods of time.

Another object of the invention is to provide a combined desiccating and sealing apparatus which makes possible the economical drying and final packaging of the product without danger of contamination and which is inexpensive in initial cost and in operation. Preferably the steps of freezing, desiccating and sealing are carried out while the containers are attached to a single chamber and preferably the same refrigerating apparatus which is employed to freeze the substance is also employed to control the temperature of the substance during desiccation.

Another object is to simplify and improve the final packaging of the material by filling the ultimate containers with an inert gas which is free from oxygen, moisture and other contaminants, thereby avoiding the difficulties attending the maintenance of vacuum in the containers as in previous processes and enabling longer storage of the material without degeneration.

Still another object of the invention is to carry out the steps of freezing, drying and final sealing of small measured quantities of the biological material while the quantities are contained in small glass ampules which constitute the ultimate containers.

A further object of the invention is to provide a marketable product which consists of an hermetically sealed package containing only the desiccated biological substance and an inert gas, such as nitrogen, from which all moisture and oxygen have been removed.

Other objects and features of the invention will be apparent from the following description:

The process consists of first freezing the biological substance, then desiccating in vacuo from the frozen condition, then breaking the vacuum by introducing an inert gas which is oxygen-free and moisture-free and then sealing the substance in its ultimate container in an atmosphere of the inert gas without permitting the introduction of moisture or oxygen.

The freezing of the substance may usually be accomplished by subjecting it to a temperature of —20° C. to —25° C., and most biological substances require from one-half hour to one hour to become thoroughly and solidly frozen at such temperatures. In the case of substances which are unusually difficult or unusually easy to freeze it will be obvious to those skilled in the art to use lower or higher temperatures. In actual practice excellent results have been obtained with immune sera, distemper virus, blood complement, and other substances by holding them at a temperature of —23° C. for about forty-five minutes.

After the material has been frozen it is thoroughly desiccated, preferably by the combined action of a high vacuum and a chemical drying agent. When the moisture has been removed from the substance it may be stored for very long periods of time at atmospheric temperatures without deterioration if it is not subject to the action of moisture, oxygen or contaminants such as alien bacteria or the like.

In previous methods of preserving biological substances by desiccation from the frozen state it has been customary to package the desiccated substance in glass ampules under a very high vacuum. Each evacuated ampule is sealed by applying heat to the glass neck and then drawing the neck out to a long fine point. Notwithstanding the fact that breakage of the pointed ends of the ampules frequently occurs, other methods of sealing the ampules have not been successfully employed because of the very great pressure differential resulting from the use of the high vacuum. In addition to the difficulties caused by actual breakage of the pointed ends, contamination will occur if any slight crack develops anywhere in the ampule because the high vacuum inside of the ampule causes air to be drawn through the crack.

Initial efforts to overcome this difficulty by storing the product in an atmosphere of inert gas met with failure, and until the development of the present process, which involves the removal of all traces of oxygen and moisture from the inert gas, it was not possible to store biological substances such as complement, viruses and immune sera for long periods of time without degeneration of the product. It appears that oxygen has a degenerating effect on practically all biological substances of this type, although the degeneration is more noticeable and rapid with some of these substances than with others. Commercial nitrogen having an oxygen content of only one-half of one percent was found to be entirely unsatisfactory, even though all moisture was removed. Likewise, the presence of small traces of moisture has a degenerating effect on biological substances and this possibly results from some chemical reaction, the nature of which is not fully understood at the present time.

It has now been found that substantially no degeneration takes place if the substance is sealed in the presence of an inert gas from which all oxygen as well as all moisture has been removed.

Accordingly the present invention provides a method and apparatus for removal of oxygen and moisture from an inert gas and the introduction of this gas into the evacuated containers to break the vacuum before they are finally sealed.

The inert gas is preferably introduced into the ultimate container at approximately atmospheric pressure. The existence of a substantial pressure within the ampule reduces the likelihood that deleterious substances will be drawn into the ampules through any minute pores or cracks in the walls of the ampules or at the point of seal, which danger exists when the ampules are sealed under substantial vacuum because of the pressure differential between the outside and inside of the ampule. It is important that during storage at above freezing temperatures biological substances in their dry state be preserved against contact with air and moisture, since air and moisture have a deleterious effect as heretofore mentioned. The elimination of high vacuum through the introduction of the inert gas also practically eliminates the difficulties which attend the sealing of ampules under a high internal vacuum since the operator can fuse the open end of the container filled with the inert gas in such a way to obtain a rounded reliable closure, whereas the closure must be drawn to a tapered point in fusing in the presence of a high internal vacuum and it sometimes happens that a perfect seal is not obtained.

In order that the ultimate consumer may know whether any substantial cracks or breaks have developed, the pressure of the inert gas in the ampules may be reduced below atmospheric pressure, so that there is a sharp intake of air the instant the ampule is opened. The low vacuum pressure which may be employed to accomplish this result, however while lower than atmospheric pressure, is much higher than the substantial vaccum pressure employed during the desiccation of the biological substance and is therefore not low enough to hinder the sealing of the ampules.

By the expression "inert gas" I mean any gas which does not react with or have a degenerative effect on biological substances. Examples of such gases are nitrogen, carbon dioxide, neon, argon and helium. For reasons already mentioned such gas must be free from contamination by moisture and free oxygen, and it is contemplated according to the invention that the gas be processed to eliminate any traces of such deleterious matter.

Referring now to the initial steps of the process, the biological substance to be preserved is preferably first divided into small measured quantities, a separate quantity being placed in each of a large number of individual glass ampules or other suitable containers. These containers are of such a nature that they may be used for the storage of the desiccated product until it is used and it will be understood that this may involve storage for a year or more.

Ordinarily, small glass ampules are employed and these ampules are conventionally provided with relatively slender elongated neck portions. Obviously, the containers may be of any desired dimensions but it may be pointed out that excellent results have been obtained with the use of ampules each having a total capacity of 2 c. c. and containing measured quantities of 0.1 c. c. of material.

In carrying out the present invention the biological substance is preferably frozen while contained in the ampule or other container. This is accomplished by subjecting the containers to a sufficiently low temperature for a sufficiently long period of time to bring about thorough and solid freezing. As stated above, excellent results have been obtained by the use of a temperature of −20° C. to −25° C. over a period of from one-half to one hour or more. Lower temperatures may be employed, but there seems to be no particular advantage in the use of lower temperatures with most substances and the use of higher temperatures would require an excessive amount of time.

In the commercial practice of the invention it is desirable to treat a large number of individual containers simultaneously and the present invention makes this possible. In general the procedure consists in first attaching a plurality of ampules containing measured amounts of the biological substances to a chamber which is adapted to be evacuated and which preferably also contains a chemical drying agent. Each ampule is connected to a passageway or tubular conduit leading outwardly from the inside of the evacuable chamber, and accordingly the interior of each ampule is in communication with the interior of the chamber.

The chamber together with the attached ampules is placed in a refrigerating zone which may conveniently consist of a compartment having cooling coils or other refrigerating means arranged adjacent the inner wall thereof. The ampules are subjected to a sufficiently low temperature for a sufficiently long period of time to solidly freeze their contents.

After the material has been frozen, the chamber is evacuated by means of a vacuum pump which is capable of maintaining a very high vacuum. It has been found that the pressure should be less than 2 mm. of mercury, and it is preferably between 0.1 and 0.5 mm. If the preferred pressures are employed, the vacuum will preferably be maintained for a period of from three to six hours. Unless a low temperature condenser is interposed between the chamber and the vacuum pump, which involves considerable expense and complication, a chemical drying agent or desiccant is used. The chemical drying agent is placed in a suitable receptacle in the lower part of the chamber and the combined action of the vacuum and the chemical drying agent results in thorough desiccation of the biological substance.

The frozen substance must not be permitted to thaw, once it is frozen and, since the vacuum is applied before the temperature is allowed to rise above the melting point, the evaporation or sublimation of water will prevent thawing. However, after the removal of most of the moisture, the temperature will begin to rise if the containers are exposed to room temperature. It has been found that in the preservation of most biological substances it is desirable to prevent the temperature from rising substantially above 0° C. until after the drying operation is completed and the vacuum broken. A temperature of —4° C. to —2° C. results in the most efficient drying and the maintenance of temperatures substantially below room temperature during the drying operation has a beneficial effect on the potency and keeping qualities of the biological substance. Accordingly, the present invention provides for the control of the temperature of the material during the drying operation and, more particularly, the temperature is preferably held considerably below room temperature and desirably at a point not substantially above 0° C. during the drying operation or during the application of the vacuum.

In order that the temperature of the ampules and their contents may be conveniently and carefully controlled during the drying operation, the vacuum chamber and the ampules attached thereto are either insulated from the atmosphere or they are surrounded by cooling coils, and, as will be explained hereinafter, both expedients may be employed for the purpose of preventing the temperatures of the ampules and their contents rising substantially above 0° C. Preferably a cooling coil is employed for this purpose and the same coil may be used to initially freeze the material in the ampules. The temperature of the coil may be changed by adjustment of a conventional regulator on the refrigerating apparatus or a separate cooling medium having a higher temperature may be circulated through the coil after the freezing has been effected.

After completion of the freezing and drying steps, the vacuum is broken by introducing an inert gas from which all moisture and oxygen have first been removed. Thereafter each of the individual containers or ampules is hermetically sealed, preferably by applying a flame to its glass neck. In view of the fact that the ampules are not evacuated at the time they are sealed, it is not necessary to leave a long pointed end on each ampule and the flame is applied in such a manner as to leave a smooth and rounded closure at the end of the ampule.

The chemical desiccant may be renewed or regenerated by heating between each operation or less frequently, depending on the amount of desiccant employed.

The process and apparatus will be further described in connection with the accompanying drawings. The drawings illustrate the invention and the apparatus in a diagrammatic way and it will be understood that the invention is not limited to the details of the apparatus.

In the accompanying drawings:

Fig. 1 is a vertical section of one form of the apparatus, some of the parts being shown in elevation;

Fig. 2 is a horizontal plan view taken on the line 2—2 of Figure 1, the cover being removed;

Fig. 3 is an enlarged view showing the manner in which an ampule is attached to the apparatus.

Fig. 8 is an enlarged fragmentary view of an ampule sealing.

Figure 4:
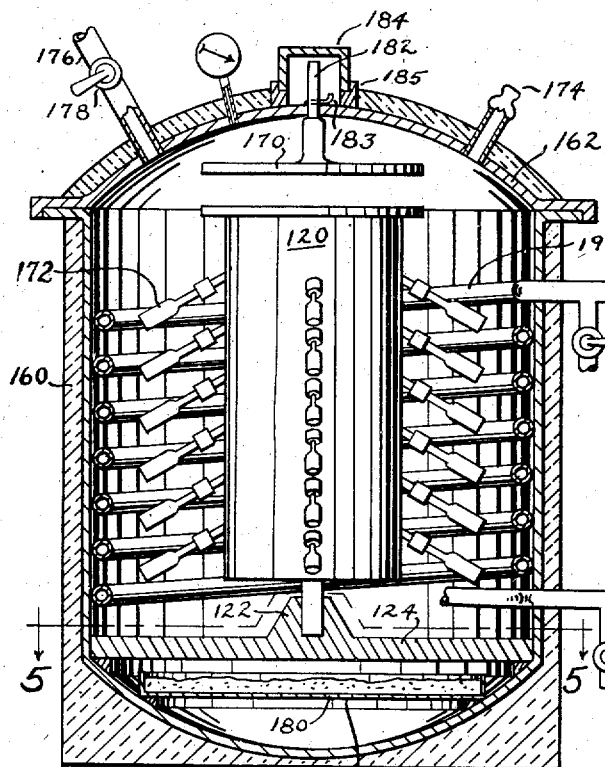
Fig. 4 is a vertical sectional view of another form of the combined desiccating and sealing apparatus.

The apparatus shown in Figure 1 includes a vacuum pump 10 which is connected to the vacuum chamber 12 by the flexible pressure tubing 14. The vacuum chamber 12 is shown as being disposed within a compartment 16 which is provided with a removable cover 18. As shown, the compartment 16 is constructed of sheet metal with a covering of insulating material.

Inside of the chamber 12 and adjacent to the bottom thereof there is provided a tray 20, indicated by dotted lines, which contains a suitable chemical drying agent. Any one of a number of well known chemical drying agents or desiccants may be employed, and the material may be spread over the bottom of the tray in a layer from one to several inches thick. Aluminum oxide has been found to be entirely satisfactory, and other drying agents such as silica gel or anhydrous calcium sulphate may be used. Preferably the tray 20 is perforated at its bottom and sides to provide better contact between the drying agent and the water vapor.

A plurality of short tubular connections 22 extends downwardly at an angle from the wall of the chamber 12, and communicates with the interior of the chamber. For convenience of illustration it is assumed that four vertical rows of tubular connections 22 are employed but it will be understood that the number of connections may be varied and they may be arranged in staggered relationship. A small glass ampule 24 containing the substance to be preserved is attached to each of the tubular connections by means of a rubber sleeve 26, which may consist of a short piece of pressure tubing.

The chamber 12 is provided with a cover 28 which is ground at its lower surface and fits against the ground upper surface of the chamber in such a manner as to form a vacuum tight closure. Wing nuts 29 may be provided to hold the cover in place but the vacuum in the chamber causes a tight engagement which renders the use of the wing nuts unnecessary during actual operation. A resilient gasket may be inserted beneath the cover 28, but a vacuum tight seal is preferably obtained merely by the use of accurately ground surfaces.

A conduit 30 leading from a source of inert gas is connected to the oxygen removal apparatus 32, which will be described hereinafter, and this in turn is connected to a U-tube 34 containing a moisture absorbent, such as calcium chloride or phosphorous pentoxide, which will remove all traces of moisture from the inert gas. The gas is conducted to the chamber 12 through a flexible conduit 36 which is provided with a valve 37.

A refrigerating coil 38 is wound around the inside of the compartment 16 and is connected by means of the conduits 40 and 41 to a conventional refrigerating apparatus which may include a regulator, as for example an adjustable expansion valve, for varying the temperature of the refrigerant. Conduits 43 and 44 preferably communicate with a supply of refrigerant maintained at a temperature of from $-5°$ to $0°$ C. or thereabouts. An ice and water mixture having a temperature of $0°$ C. may be employed or the temperature may be lowered slightly by the addition of a small amount of salt. The conduits 40 and 41 are provided with valves 45 and 46 and the conduits 43 and 44 are provided with valves 47 and 48. The refrigerating apparatus may be adjusted to maintain a freezing temperature of say $-25°$ C. and when the material has been frozen the valves 45 and 46 may be closed and the valves 47 and 48 may be opened to bring the temperature of the coil to the temperature of the refrigerant in the conduits 43 and 44. If the refrigerator is equipped with a regulator and if it is not convenient to use a separate refrigerant in the conduits 43 and 44, an equivalent result may be obtained by adjustment of the refrigerating apparatus. It will be understood that the temperatures mentioned are merely representative of temperatures which have been found suitable for numerous biological substances and other temperatures may be preferable in some instances.

As stated above, the cover 18 is removable to permit convenient access to the apparatus inside the compartment 16. The vacuum chamber 12 has affixed to its lower end a downwardly extending male member 50 which is loosely inserted in the female member 51 secured to the bottom of the compartment 16. A handle 52 may be secured to the cover 28 of the chamber 12 and, if the cover is clamped in place, the entire chamber 12 may be readily lifted out of the compartment 16, sufficient slack being provided in the flexible conduits 14 and 36 for this purpose. If wing nuts or other clamping means are not provided, handles may be placed on the side wall of the chamber 12 for convenient removal of the chamber. The conduits 14 and 36 may enter the compartment 16 through apertures in the wall of the compartment 16 but preferably they will pass through slots 53 extending downwardly from the upper edge of the walls of the chamber 16.

The vacuum gauge shown diagrammatically at 54 is connected preferably by means of a flexible conduit 56 with the conduit 14 leading to the vacuum pump 10. The vacuum pump shown is merely representative of several types which may be used and in some instances the use of some other type such as a steam injection vacuum pump may be preferred.

In operation, a small amount of the biological substance is placed in each ampule and usually a plug of absorbent cotton is loosely inserted in the ends. The ampules are then attached to the connections 22 by means of the rubber sleeves 26, and during the attachment of the ampules the chamber 12 is preferably outside of the compartment 16. If desired, a cotton plug may also be inserted in the flexible conduits leading to the chamber 12. It should be emphasized, however, that the cotton plugs must be loose enough so as not to substantially impede the flow of gases.

As soon as all of the ampules have been attached to the chamber 12, the chamber is placed within the compartment 16 and the covers 28 and 18 are secured in place. The valves 45 and 46 are opened (the valves 47 and 48 being closed), and the refrigerant which is thus caused to flow through the refrigerating coil 38 will cool the interior of the compartment to a temperature of from $-20°$ C. to $-25°$ C. This temperature is maintained for a sufficient period of time to insure that all of the material is thoroughly and solidly frozen and this usually requires a half hour or more.

After the material is frozen, the temperature is raised to approximately $-5°$ C. to $0°$ C. This may be done by closing the valves 45 and 46 and opening the valves 47 and 48 so as to circulate a separate refrigerant having this temperature, or the temperature of the refrigerant in conduits 40 and 41 may be raised to the desired point by adjustment of the refrigerating apparatus.

Thereupon the vacuum pump 10 is set in operation, the valve 37 in the conduit 36 having been first closed, and the vacuum pump is permitted to run until the material within the ampules has been completely desiccated. Usually this will require about five or six hours at a pressure of about 0.5 mm. of mercury as registered in the gauge 54.

After the material is thoroughly dried, the vacuum in the chamber 12 is broken by opening the valve 37 and permitting the flow of purified inert gas into the chamber and into the ampules. Shortly after the valve 37 is opened and when the vacuum pump has become filled with the inert gas the pump is turned off. If this procedure is followed there will be no diffusion of the inert gas back into the chamber 12 such as might result in contamination thereof in the event air should leak into the chamber through the pumping system but, if desired, a valve may be provided in the line 14 which may be shut off to further insure against ingress of air.

After the chamber 12 and the ampules 24 have become filled with inert gas at substantially atmospheric pressure, the valve 37 is closed, the cover 18 is removed and the chamber 12 is lifted out of the compartment 16 without removing the cover 28.

It is to be understood that various means may be provided for elevating or supporting the chamber 12 at a position immediately above or to one side of the compartment 16. However, the chamber 12 may be readily lifted out of the compartment 16 by hand and allowed to rest on the floor next to the compartment 16. The ampules which now contain only the desiccated substance and the inert gas are sealed by applying a Bunsen burner or other source of heat to their glass necks until fusion occurs. Following a well known technique the operator may then quickly pull the ampule away to form a hermetic seal and upon continued application of heat, while the ampule is held in upright position, the sealed end will assume a rounded or substantially semispherical shape as shown in Fig. 8.

In Fig. 4 there is shown another form of the combined apparatus for desiccating the biological substance and sealing it with an atmosphere of inert gas in the ampules. In this embodiment the chamber 120 is supported by a suitable standard 122 on transverse rods 124 extending across the lower portion of compartment 160. The compartment 160 has a removable cover 162 and the latter is adapted to support the cover 170 in chamber 120 in an elevated position as shown in Fig. 4 so as to provide communication between the interior of the chamber 120 and the interior of the compartment 160. Since the ampules 172 are connected to the interior of the chamber 120 in the same manner as has been described in connection with Fig. 1, evacuation of the compartment 160 will result in evacuation of the ampules.

The compartment 160 is connected to a suitable vacuum pump by means of the flexible conduit 174, and a flexible conduit 176 having a valve 178 is connected to a source of pure inert gas as described in connection with Fig. 1. It will be understood that in this embodiment the conduits 174 and 176 may enter the side of the compartment 160, and in this event they need not be flexible.

One or more trays 180 containing aluminum oxide or other chemical drying agent are preferably placed in the bottom of the compartment 160 as shown in Fig. 4.

A refrigerating coil 190 is disposed inside of the wall of the compartment 160 and is connected to a suitable refrigerating system not shown in the drawings. As in the embodiment shown in Fig. 1, means may be provided for controlling the temperature in the coil 190 and it may be cooled to such an extent as to bring about freezing of the material in the ampules 172. Thereafter the temperature may be raised and the coil 190 may be used to keep the ampules at a temperature of 0° C. or other suitable temperature during the drying operation.

The cooling coil 190 may be employed merely to prevent an undue rise in the temperature of the ampules, and for reasons explained above the temperature preferably is not permitted to rise above 0° C. In the use of this apparatus in such event the step of freezing the contents of the ampules may be conveniently carried out by placing the entire chamber 120 with the attached ampules in an ordinary ice cream refrigerator such as is used at soda fountains and with which a temperature of approximately —20° C. to —25° C. may be obtained. The chamber and attached ampules should be left in the refrigerator for a period of at least one-half hour or until the biological substance is thoroughly frozen. Thereupon the chamber and the attached ampules are taken out of the refrigerator and placed inside of the compartment 160 and the cover 162 is secured in place as shown in Fig. 4. A vacuum tight joint is provided between the cover 162 and the compartment 160 by the use of ground surfaces or a gasket.

Whether freezing of the biological substance be effected in compartment 160 or in a separate refrigerating unit before introducing chamber 120 and the ampules into compartment 160, the vacuum pump is now turned on to evacuate the interior of compartment 160, chamber 120 and the ampules 172. It will be understood that during the evacuation the valve 178 is closed and the cover 170 is supported a substantial distance above the chamber 120 by the mechanism described below.

The cover 162 is provided with a central aperture through which extends a vertical rod 182 which has a tight sliding fit therein. The rod 182 has the cover 170 secured to its lower end and is held in its uppermost position, as shown in Fig. 4, by a transverse pin 183 inserted in a transverse aperture in the rod 182, the pin engaging the upper surface of the cover 162 and holding the rod in the position shown. While the joint formed between the rod 182 and the cover 162 is substantially fluid tight, it is not entirely so and therefore a cap 184 is detachably secured to the cover 162 as by mounting it in the shouldered collar 185. The lower edge of the cap 184 and the contacting surface of the collar 185 are ground to insure a vacuum tight joint. The contacting surfaces may be coated with a lubricant and the vacuum will hold the cap 184 in tight engagement with the collar.

In operation, the material is completely dried in the ampules 172 as the result of the combined action of the vacuum and the chemical drying agent in tray 180 and then the valve 178 is opened to permit the introduction of pure inert gas and the consequent breaking of the vacuum. As described in connection with the first modification, the vacuum pump is shut off subsequently. After the ampules have been filled with inert gas, the cap 184 is removed from the collar 185 and the pin 183 is withdrawn from the rod 182 to permit the cover 170 to drop and close the chamber 120.

Thereafter the cover 162 is removed from the compartment 160 without disturbing the chamber 120 or its cover 170 and the chamber 120 may now be taken out of the compartment 160. Provided the cover 170 is not removed, there will be no opportunity for the inert gas to leave the ampules 172 and no oxygen, moisture or other substance will be permitted to enter the ampules. While the chamber 120 is outside of the compartment 160 and while the cover 170 is still in place, a Bunsen burner or other source of heat is applied to the neck of each ampule to hermetically seal it in the manner previously described.

Figure 6:
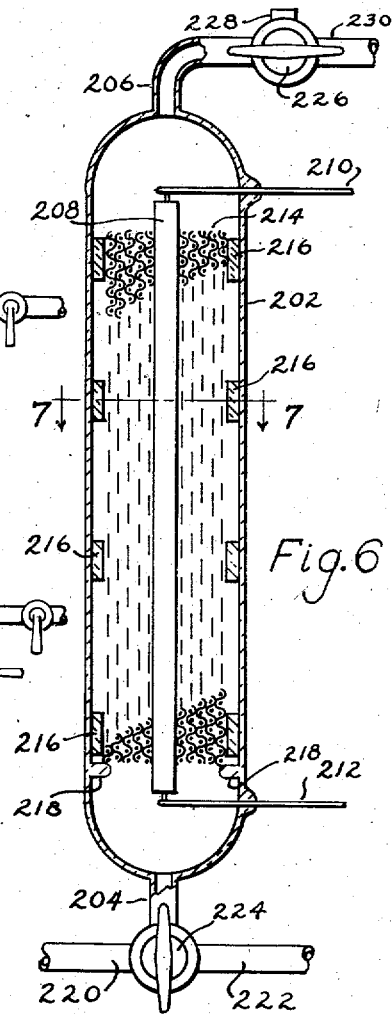
Fig. 6 is a vertical section of the apparatus for removing oxygen from the inert gas.
Figure 5:
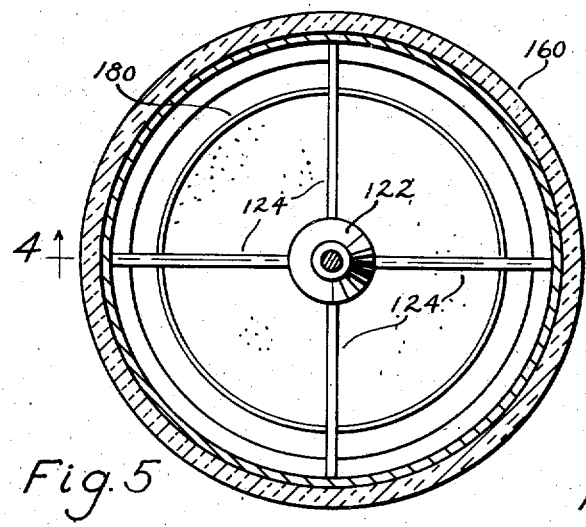
Fig. 5 is a horizontal section taken on line 5—5 of Fig. 4.
Figure 7:
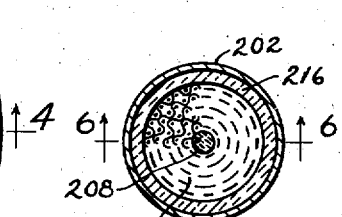
Fig. 7 is a horizontal section taken on the line 7—7 of Fig. 5.

The apparatus for removing oxygen from the inert gas is shown in Fig. 6 and Fig. 7 and consists of means for supporting and heating a quantity of oxidizable metal in a conduit through which the gas is caused to flow. Any oxygen present in the gas will combine with the metal. If the metal is subsequently reduced by passing a stream of hydrogen through the conduit the apparatus may be used again and again.

More particularly, the preferred apparatus includes a substantially cylindrical glass tube 202 which is provided with an inlet 204 at its lower end and an outlet 206 at its upper end. A heating element 208 is supported between wires 210 and 212, the latter passing through the wall of the tube 202 as shown or through tubular glass projections which may extend laterally from the apparatus. Various types of heating elements may be employed, but a particularly satisfactory type of heating element is known as the "Calrod" manufactured by the General Electric Company, and consists of a suitable filament embedded in an insulating material contained within a tubular casing, the latter being made of a heat-resisting alloy. The particular heating element which has been successfully employed has a capacity of about 500 watts, and in normal use it will heat the interior of the tube 202 to a temperature of about 400° C.

Woven copper gauze 214 of the type used in window screening is wrapped tightly around the heating element 208 to a total thickness which is nearly the same as the inside diameter of the tube 202. Only enough space is left between the copper gauze and the tube to receive a layer of packing material 216 which is impervious to gas. This packing may consist of asbestos tape having a thickness of about one-sixteenth of an inch. The packing or tape 216 is wrapped tightly around the copper gauze at several points and provides a snug and gas tight fit between the copper gauze and the inside of the glass tube and also prevents direct transmission of heat from the copper wire to the glass tube. It will be understood that the superimposed layers of woven wire will provide a mass of metal having numerous interstices therein which permit the flow of gas through the mass. Moreover, the packing material 216 does not permit the gas to flow through the conduit without passing through the mass of woven wire.

Just below the roll of copper wire gauze and at a point above the lower end of the tube 202, internal projections 218, which may be formed of glass, are provided for the purpose of supporting the mass of metal 214 in the position shown.

Two conduits 220 and 222 lead to the apparatus and communicate with the inlet 204 through a three-way valve 224. The conduit 220 is connected to a source of inert gas and the conduit 222 is connected to a source of hydrogen which is used for reducing the oxide formed after the apparatus has been in use for some time. The outlet 206 is connected by valve 226 with conduit 230 leading to the moisture removal apparatus 34 (Figure 1) to supply thereto inert gas from line 220 after purification, and also connects with a discharge pipe 228 through which water vapor resulting from deoxidation of the apparatus by hydrogen from line 222 during reconditioning of the apparatus is discharged. It will be understood that valve 224 may be selectively opened from its closed position to connect either lines 220 or 222 to the apparatus inlet 204, and that valve 226 may be opened from its closed position to open apparatus outlet 206 either to conduit 230 or discharge pipe 228. It will be understood that valve 226 will be adjusted to open conduit 230 when valve 224 opens line 220, and that the two valves will alternately be operated to maintain, simultaneously open, line 222 and discharge pipe 228.

It is quite important that the tube 202 be disposed in substantially a vertical position since this results in a tremendous increase in efficiency as compared with similar apparatus disposed in a substantially horizontal position. The reason for this is that the hot gases tend to rise and, if the tube were horizontal, a portion of the copper wire along the top would become quickly and completely oxidized after which this area would serve to conduct gases without removing the oxygen therefrom. If, on the other hand, the tube is arranged in a vertical position the gas will be evenly distributed throughout this mass of woven wire and, as long as all of the metal has not become oxidized, the removal of oxygen will continue.

It will be understood that various inert gases may be used for breaking the vacuum and for packaging the desiccated biological substances. As examples of satisfactory gases, nitrogen, carbon dioxide, neon, argon and helium may be mentioned. Any of these gases may be treated by the method and apparatus described above to remove traces of moisture and oxygen. Obviously it will be desirable in some instances to employ two sets of apparatus for removing moisture and oxygen in order that the process need not be interrupted while the oxidized metal is being regenerated and while the moisture absorbent is being replenished or regenerated. As will be understood, the heating element 208 is energized not only during the removal of oxygen from the inert gas but also during the reduction of the oxidized metal to restore the apparatus to its initial condition. The desirability of running a quantity of inert gas through the apparatus after the step of regeneration to remove the hydrogen will also be apparent, and this may be done with the assistance of a vacuum pump and before the ampules are placed in the apparatus.

The processes and apparatus described above have been successfully used in treatment of various biological substances including immune sera, complement, viruses, blood plasma, bacterial cultures and protenious solutions generally. The term "biological substances" or "biologically active substances" are used in their ordinary sense as understood in the art.

Various changes in the procedure or apparatus described above may be made by those skilled in the art without departing from the invention, the scope of which is limited only by the ensuing claims.

I claim as my invention:

1. A method of preserving a dried biological substance desiccated from the frozen state which is under high vacuum in a container in which it is to be stored for future use, including the steps of replacing the high vacuum by filling the evacuated container with an atmosphere of inert gas uncontaminated by moisture or free oxygen while maintaining the dried biologically active substance in the container immune from moisture and air, and sealing the container with said substance and inert gas atmosphere therein.

2. A method of preserving a biological substance by high vacuum desiccation thereof from the frozen state in the container in which it is to be stored, which includes the steps of replacing the high vacuum existing in the container as a result of desiccation, after the biologically active substance has been completely dried and without exposing the dried substance to contact by moisture or free oxygen, with an inert gas processed to remove moisture and free oxygen therefrom, and sealing the container with the dried biologically active substance and inert gas atmosphere therein.

3. The process of preserving a biological substance which comprises introducing a quantity of the substance into a container adapted for storage thereof until required for use, freezing the biological substance to solid frozen state in the container, then desiccating the substance from its frozen state under high vacuum applied to the container, thereafter relieving the vacuum existing in the container at the completion of dessiccation without admitting free oxygen or moisture into the container while the dried substance is still in its dry state by filling the container with an inert gas uncontaminated by free oxygen and moisture, and sealing the container with the dried biological substance and said inert gas atmosphere therein.

4. The process of preserving a biological substance to claim 3 wherein the substance is desiccated from its frozen state by the combined action of high vacuum and a chemical drying agent.

5. The process of preserving a biological substance in heat sealable containers such as ampules and bottles of glass which includes introducing a quantity of the biological substance into such a container, freezing the substance to solid frozen state in the container, then desiccating this substance while in its frozen state under high vacuum applied to the container, thereafter relieving the vacuum in the container in the absence of free oxygen and moisture while the substance is still in its dry state by filling the container with an inert gas uncontaminated by free oxygen and moisture, and heat sealing the container with the dried biological substance and said inert gas atmosphere therein at substantially atmospheric pressure.

6. The process of preserving a biological substance which comprises introducing a quantity of the substance into a container adapted for storage of the substance until required for use, freezing the substance solid in the container by subjecting the same to a temperature substantially below 0° C., then applying a high vacuum to the container for a prolonged period to dry the substance and refrigerating the outside of the container during drying at a temperature substantially higher than the temperature during freezing but not substantially to exceed 0° C., thereafter relieving the vacuum in the container in the absence of free oxygen and moisture while the substance is still in its dry state by filling the container with an inert gas uncontaminated by free oxygen and moisture, and sealing the container with the dried biological substance and said inert gas atmosphere therein.

7. The process of preserving a biological substance which comprises introducing a quantity of the substance into a container adapted for storage of the substance until required for use, introducing the container into a cooling chamber, freezing the substance solid by refrigerating the container in said chamber to a sub-freezing temperature substantially below 0° C., then discontinuing application of said sub-freezing refrigerating temperature and while still retaining the container in the cooling chamber desiccating the substance from its frozen state under high vacuum applied to the container, thereafter relieving the vacuum in the container in the absence of free oxygen and moisture by filling the container containing the dried substance with an inert gas uncontaminated by free oxygen and moisture, removing the container from the closed chamber and sealing the container with the dried biological substance and inert gas atmosphere therein.

8. The process of preserving a biological substance which comprises introducing a quantity of the substance into a container adapted for storage of the substance until required for use, freezing the substance solid in the container, subjecting the interior of the container to high vacuum to dry the substance from its frozen state and simultaneously subjecting the exterior of the container to a counter-balancing high vacuum, thereafter relieving the vacuum in the container in the absence of free oxygen and moisture while the substance is still in its dry state by filling the container with an inert gas uncontaminated by free oxygen and moisture, and sealing the container with the dried biological substance and said inert gas atmosphere therein.

9. The process of preserving a biological substance which comprises introducing into a container adapted for storage of the substance until required for use in amounts sufficient to only partially fill the container, freezing the substance to a solid state in the container, subjecting the interior of the container to high vacuum to desiccate the substance from its frozen state, and during desiccation subjecting the exterior of the container to high vacuum and refrigeration, thereafter relieving the vacuum in the container in the absence of free oxygen and moisture while the substance is still in its dry state by filling the container with an inert gas uncontaminated by free oxygen and moisture, and sealing the container with the dried biological substance and said inert gas atmosphere therein.

10. The processing of a biological substance to preserve the same which includes introducing portions of the substance into a plurality of individual containers adapted for storage of the substance until required for use, connecting the various containers to an evacuatable chamber, simultaneously freezing the substance to solid state in the various containers by applying to the chamber and the attached containers a sub-freezing temperature, then discontinuing application of the sub-freezing temperature when the substance has been reduced to the solid frozen state and applying a high vacuum to said chamber to simultaneously desiccate the substance in the various containers, and after desiccation has been completed breaking the high vacuum by introducing into the chamber an inert gas uncontaminated free oxygen and moisture so as to simultaneously fill the various containers with said inert gas, then closing the chamber against the escape of the inert gas or the admission of oxygen and moisture into the containers, and sealing the containers with the dry biological substance and inert gas therein.

11. The processing of a biological substance which comprises introducing the substance into a plurality of individual containers adapted for storage of the substance until required for use, connecting the containers to an evacuatable chamber, introducing said chamber and attached containers into a cooling compartment, refrigerating the containers in said compartment at a sub-freezing temperature substantially below 0° C. to freeze the substance solid in the containers, thereafter discontinuing application of the sub-freezing temperature when the substance has been reduced to the solid frozen state and applying a high vacuum to the chamber while in the compartment and desiccating the material in the various containers, breaking the vacuum by introducing into the chamber an inert gas uncontaminated by free oxygen and moisture and filling the containers with said inert gas, and removing the chamber with the attached containers from the cooling chamber while maintaining the same against the admission of oxygen and moisture therein, and sealing the various containers with the dried biological substance and inert gas therein.

12. The processing of a biological substance according to claim 11 wherein during desiccation the cooling chamber is refrigerated at a higher temperature than during freezing of the substance in the containers.

13. The process of claim 11 wherein during desiccation the cooling chamber surrounding the containers as well as the interior of the containers is maintained under high vacuum.

14. The process of claim 11 wherein during desiccation the cooling chamber surrounding the containers is refrigerated at a higher temperature than during freezing of the substance in the container and subjected to a high vacuum.

15. As a new article of manufacture, a sealed container adapted for storing biologically active substances for future use, a quantity of dried biologically active substance derivative of high vacuum desiccation from the frozen state in the container, and an atmosphere non-deleterious to the dried biologically active substance filling the container and comprising a dry inert gas devoid of free oxygen.

16. As a new article of manufacture, a container adapted for storing biologically active substances for future use and having sealed therein under an internal pressure not less than approximately atmospheric pressure a quantity of dried biologically active substance derivative of high vacuum desiccation from the frozen state in an inert gas uncontaminated by free oxygen or moisture.

17. As a new article of manufacture, a sealed storage container of thermoplastic material adapted for the storage of biologically active substances, of the class including glass ampules and bottles and the like which are apparently air and moisture tight but likely to have accidental openings such as pores and cracks at the point of seal and other areas thereof through which air and moisture may penetrate under pressure from the outside if the containers be sealed with a substantial vacuum therein, a quantity of dried biologically active substance in the container derivative of high vacuum desiccation from the frozen state and capable of storage for prolonged periods before restoration to hydrated state for use but susceptible to deterioration during storage if exposed to air and moisture, and a pressure medium in the container non-deleterious to the dried biologically active substance for preventing leakage of air or moisture into the container during storage and comprising a dry inert gas uncontaminated by moisture or free oxygen.

18. An hermetically sealed container in the form of a glass ampule or bottle containing a quantity of dried biologically active substance from the class consisting of viruses, sera, blood plasma, complement and proteinaceous solutions, and being filled with an atmosphere non-deleterious to the dried biological substance comprising oxygen-free and moisture-free nitrogen.

19. A container of heat-fusible material having a neck portion, and containing a quantity of dried biologically active substance derivative of high vacuum desiccation from the frozen state and an atmosphere of dry inert gas uncontaminated by free oxygen and at substantially atmospheric pressure hermetically sealed in the container by a pointless rounded fused wall closing the outer end of the container neck portion.

20. Apparatus for treating a frozen biological substance in a container in which it is to be sealed and stored for later use comprising an evacuatable chamber, an outlet connection on the chamber for attaching the container with its interior in communication with the interior of the chamber, desiccating means including a source of high vacuum connecting with the interior of the chamber for desiccating the biological substance in the container from its frozen state, means for breaking the high vacuum in the chamber and container comprising a source of inert gas uncontaminated by moisture or free oxygen connecting with the interior of the chamber for filling the container with said inert gas, and control means operable to successively effect desiccation of the frozen biological substance in the container by the desiccating means and filling of the evacuated container with said inert gas from said gas source after drying of the biological substance is completed preparatory to sealing the container.

21. Apparatus for treating a frozen biological substance in a container in which it is to be sealed and stored comprising desiccating means including a source of high vacuum, means for establishing communication between said desiccating means and the interior of the container for drying the biological substance from its frozen state in the container, a source of inert gas, means connecting with said gas source for processing said gas to remove moisture and free oxygen therefrom, and means for connecting the container with said gas processing means to supply gas to break vacuum in the container after drying is completed and fill the container containing the dried biological substance with said processed inert gas preparatory to sealing of the container.

22. Apparatus for treating a frozen biological substance in a container in which it is to be sealed and stored comprising desiccating means including a source of high vacuum and a chemical drying agent cooperative to desiccate the biological substance in the container from its frozen state, means establishing communication between the container and both the source of high vacuum and the chemical drying agent during drying, a source of inert gas uncontaminated by moisture or free oxygen, and means establishing communication between the container and said gas source after drying of the biological substance is completed to break the high vacuum in the container and fill the container with said inert gas preparatory to sealing of the container.

23. Apparatus for treating a frozen biological substance in a container in which it is to be sealed and stored comprising desiccating means including a source of high vacuum, means for establishing communication between said desiccating means and the interior of the container to desiccate the biological substance from its frozen state in the container, refrigerating means operable to externally cool the container during desiccation, and means for replacing the high vacuum existing in the container as a result of drying with an inert gas non-deleterious to the dried biological substance preparatory to sealing of the container.

24. In apparatus for preserving a biological substance by desiccation from the frozen state in a container in which it is to be sealed and stored, a fluid tight compartment adapted to receive the container with the biological substance therein, desiccating means including a source of high vacuum, and means establishing communication between said desiccating means and both the interior of the container and the space of the compartment outside of the container for effecting high vacuum desiccation of the biological substance within the container and simultaneously maintaining a protecting vacuum outside the container.

25. In apparatus for preserving a biological substance by desiccation from the frozen state in a container in which it is to be sealed and stored, a fluid tight compartment adapted to receive the container with the biological substance therein, desiccating means including a source of high vacuum, means establishing communication between said desiccating means and both the interior of the container and the space of the compartment outside of the container for effecting high vacuum desiccation of the biological substance within the container and simultaneously maintaining a protecting vacuum outside the container, and refrigerating means in the compartment for cooling the biological substance during desiccation.

26. In apparatus for preserving a biological substance by desiccation from the frozen state in the containers in which it is to be sealed and stored, the combination of a chamber, a plurality of outlets in the wall of the chamber to which a plurality of containers with the biological substance therein may be attached, a fluid tight compartment in which the chamber with the attached containers is removably mounted, an opening in the chamber establishing communication between the interior of the chamber and containers and the interior of the compartment, a source of high vacuum, conduit means connecting said source with the interior of the compartment for evacuating the chamber and containers and desiccating the biological substance in the containers, a closure member for the chamber opening adapted to be closed to seal the chamber and attached containers from communication with the compartment after the biological substance has been dried and preparatory to removal of the chamber from the compartment, and actuating means for closing said chamber closure member without opening the compartment.

27. Apparatus for preserving a biological substance according to claim 26 further including a source of inert gas uncontaminated by moisture or free oxygen, conduit means connecting said gas source with the interior of the compartment and adapted to supply said inert gas after drying has been completed to break the vacuum and fill the containers preparatory to sealing of the chamber for removal from the compartment.

28. Apparatus for treating a biological substance in containers in which it is to be sealed and stored comprising a portable evacuatable chamber, a plurality of outlets in the wall of the chamber for attaching a plurality of containers containing the biological substance in communication with the interior of the chamber, a closed compartment adapted to receive the chamber with attached containers, refrigerating coils in the compartment for freezing the biological substance in the containers to solid state, desiccating means including a source of high vacuum for drying the biological substance from its frozen state in the containers, means establishing communication between the desiccating means and the chamber within the compartment during drying, means for cutting off communication to the chamber subsequent to drying, and a closure member on the compartment removable for withdrawal of the chamber from the compartment preparatory to sealing of the containers.

29. Apparatus for treating a biological substance according to claim 28 further including a source of inert gas uncontaminated by moisture or free oxygen and means for establishing communication between said gas source and the chamber in the compartment after drying of the biological substance is completed to break the vacuum and fill the containers with said inert gas.

HEINZ A. SIEDENTOPF.

Disclaimer 2,380,339.—*Heinz A. Siedentopf*, St. Paul, Minn. METHOD AND APPARATUS FOR PRESERVING BIOLOGICAL SUBSTANCES. Patent dated July 10, 1945. Disclaimer filed Nov. 26, 1947, by the inventor; the assignee, *Fromm Laboratories, Inc.*, consenting.

Hereby enters this disclaimer to claim 24 of said patent.

[*Official Gazette December 30, 1947.*]

between said desiccating means and both the interior of the container and the space of the compartment outside of the container for effecting high vacuum desiccation of the biological substance within the container and simultaneously maintaining a protecting vacuum outside the container.

25. In apparatus for preserving a biological substance by desiccation from the frozen state in a container in which it is to be sealed and stored, a fluid tight compartment adapted to receive the container with the biological substance therein, desiccating means including a source of high vacuum, means establishing communication between said desiccating means and both the interior of the container and the space of the compartment outside of the container for effecting high vacuum desiccation of the biological substance within the container and simultaneously maintaining a protecting vacuum outside the container, and refrigerating means in the compartment for cooling the biological substance during desiccation.

26. In apparatus for preserving a biological substance by desiccation from the frozen state in the containers in which it is to be sealed and stored, the combination of a chamber, a plurality of outlets in the wall of the chamber to which a plurality of containers with the biological substance therein may be attached, a fluid tight compartment in which the chamber with the attached containers is removably mounted, an opening in the chamber establishing communication between the interior of the chamber and containers and the interior of the compartment, a source of high vacuum, conduit means connecting said source with the interior of the compartment for evacuating the chamber and containers and desiccating the biological substance in the containers, a closure member for the chamber opening adapted to be closed to seal the chamber and attached containers from communication with the compartment after the biological substance has been dried and preparatory to removal of the chamber from the compartment, and actuating means for closing said chamber closure member without opening the compartment.

27. Apparatus for preserving a biological substance according to claim 26 further including a source of inert gas uncontaminated by moisture or free oxygen, conduit means connecting said gas source with the interior of the compartment and adapted to supply said inert gas after drying has been completed to break the vacuum and fill the containers preparatory to sealing of the chamber for removal from the compartment.

28. Apparatus for treating a biological substance in containers in which it is to be sealed and stored comprising a portable evacuatable chamber, a plurality of outlets in the wall of the chamber for attaching a plurality of containers containing the biological substance in communication with the interior of the chamber, a closed compartment adapted to receive the chamber with attached containers, refrigerating coils in the compartment for freezing the biological substance in the containers to solid state, desiccating means including a source of high vacuum for drying the biological substance from its frozen state in the containers, means establishing communication between the desiccating means and the chamber within the compartment during drying, means for cutting off communication to the chamber subsequent to drying, and a closure member on the compartment removable for withdrawal of the chamber from the compartment preparatory to sealing of the containers.

29. Apparatus for treating a biological substance according to claim 28 further including a source of inert gas uncontaminated by moisture or free oxygen and means for establishing communication between said gas source and the chamber in the compartment after drying of the biological substance is completed to break the vacuum and fill the containers with said inert gas.

HEINZ A. SIEDENTOPF.

Disclaimer 2,380,339.—*Heinz A. Siedentopf*, St. Paul, Minn. METHOD AND APPARATUS FOR PRESERVING BIOLOGICAL SUBSTANCES. Patent dated July 10, 1945. Disclaimer filed Nov. 26, 1947, by the inventor; the assignee, *Fromm Laboratories, Inc.*, consenting.

Hereby enters this disclaimer to claim 24 of said patent.

[*Official Gazette December 30, 1947.*]